(12) United States Patent
Tsai

(10) Patent No.: US 8,154,650 B2
(45) Date of Patent: Apr. 10, 2012

(54) ELECTRONIC DEVICE HAVING A CAMERA FLASH REDIRECTOR

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 12/409,175

(22) Filed: Mar. 23, 2009

(65) Prior Publication Data

US 2010/0238344 A1  Sep. 23, 2010

(51) Int. Cl.
*H04N 5/222* (2006.01)
*H04N 5/225* (2006.01)
(52) U.S. Cl. ........... 348/371; 340/374; 340/375; 396/62
(58) Field of Classification Search ........... 348/370–371
See application file for complete search history.

(56) References Cited

U.S. PATENT DOCUMENTS

| | | | |
|---|---|---|---|
| 3,552,286 | A | 1/1971 | Hoton et al. |
| 4,323,952 | A | 4/1982 | Proske |
| 4,570,204 | A | 2/1986 | Caimi |
| 5,805,940 | A | 9/1998 | Lawther et al. |
| 6,449,088 | B1 * | 9/2002 | Pettingell et al. ............ 359/386 |
| 7,298,970 | B2 | 11/2007 | Liang et al. |
| 7,764,880 | B2 * | 7/2010 | Hamada ...................... 396/157 |
| 2003/0095192 | A1 * | 5/2003 | Horiuchi ..................... 348/222.1 |
| 2005/0174474 | A1 * | 8/2005 | Hasegawa .................... 348/370 |
| 2007/0139548 | A1 * | 6/2007 | Sugimoto et al. ............ 348/371 |
| 2008/0106637 | A1 * | 5/2008 | Nakao et al. ................. 348/371 |
| 2008/0231742 | A1 * | 9/2008 | Kurase ..................... 348/333.01 |
| 2009/0160944 | A1 | 6/2009 | Trevelyan et al. |

OTHER PUBLICATIONS

"Focusing Your Flash for 'Freezing' Motion", Science Buddies, Internet article at: http://www.sciencebuddies.org/science-fair-projects/project_ideas/Photo_p013.shtml, Last edit date: Jan. 5, 2007, downloaded on Dec. 4, 2008, (pp. 1-6).
"Samsung Soul U900 Review", Internet article at: http://www.knowyourmobile.com/samsung/samsungsoulu900/sam..., May 22, 2008, downloaded on Jan. 7, 2009, (3 pages).
"Using Variable Power: Flash Compensation (M-REC Mode Only)", Internet article at: http://www.cs.mtu.edu/~shene/DigiCam/User-Guide/995/INTER..., modified Dec. 1, 2001, downloaded on Jan. 7, 2009, (3 pages).
Schmidt, Wayne, "Build Your Own Flash Focuser", Wayne Schmidt personal web pages [accessed Dec. 12, 2006], Internet article at: http://www.waynesthisandthat.com/flashfocuser.html, Downloaded on May 29, 2009, (2 pages).
Willaims, Martyn, "Panasonic's Touch Screen Camera Simplifies Photo Taking", Macworld, Mar. 19, 2008, Internet article at: http://www.macworld.com/article/132591/2008/03/panasonic.html, downloaded on Jan. 7, 2009, (1 page).

(Continued)

*Primary Examiner* — Ngoc-Yen Vu
(74) *Attorney, Agent, or Firm* — Blakely, Sokoloff, Taylor & Zafman LLP

(57) ABSTRACT

An electronic camera device has an imaging sensor to capture an image of a scene, a flash to illuminate the scene for capture by the sensor, and an evaluator to detect a condition in the scene. A redirector shifts the peak of a spatial energy profile of light from the flash. The peak is shifted from being aimed at one region in the scene to being aimed at another region in the scene, in response to the evaluator having detected the condition in the scene. Other embodiments are also described and claimed.

15 Claims, 5 Drawing Sheets

OTHER PUBLICATIONS

LEDs Magazine, Articles: Implementing LED Flash in Camera Phones, Apr. 2005, URL: http://www.ledsmagazine.com/features/2/4/1/1, (4 pages).

"Luxeon Flash for Cell Phone Camera, PDA and DSC Applications", Lumileds, Reference Design DR01, Feb. 2005, (6 pages).

"Wireless Flash Article", Updated Aug. 2006, Minolta's Wireless Flash, URL: http://www.friedmanarchives.com/flash.htm, (16 pages).

Raskar, Ramesh, et al., "Coded Exposure Photography: Motion Deblurring Using Fluttered Shutter", Mitsubishi Electric Research Labs (MERL), SIGGRAPH 2006, Cambridge, MA, URL: http://www.merl.com/people/raskar/deblur, (10 pages).

Raskar, Ramesh, "Computational Photography", Microsoft PowerPoint presentation, Mitsubishi Electric Research Labs, Modified: Monday, Jun. 26, 2006 11:47p.m., Cambridge, MA, URL: http://www.Merl.com/people/raskar/ photo, (37 pages).

Williams, Jim, et al., "Simple Circuitry for Cellular Telephone/Camera Flash Illumination", A Practical Guide for Successfully Implementing Flashlamps, Linear Technology, Application Note 95 (AN95-1), Mar. 2004, (12 pages).

\* cited by examiner

ELECTRONIC DEVICE HAVING A CAMERA FLASH REDIRECTOR

An embodiment of the invention relates generally to electronic devices having a camera function (referred to here as electronic camera devices), and more particularly to techniques for controlling the camera flash. Other embodiments are also described.

BACKGROUND

In photography, there has been recognized the need for providing flash illumination, at an angle that is suited to the scene coverage of a zoom lens. A zoom lens is capable of a variable range of focus from telephoto to wide-angle settings. Improved image quality may result if the flash illumination angle or spread about the center optical axis of the flash is adjusted to correspond to the scene coverage angle. Thus, at the telephoto setting the flash illumination should be well collimated, while at the wide-angle setting, the flash illumination should be spread over a relatively wide angle about the center axis. In such a camera apparatus, the flash itself may have a variable focus lens that is controlled in response to the focus setting of the zoom lens. This may also be described as a flash beam focuser, which focuses the light from the flash into a smaller or a larger area at the center of the frame (center axis of the flash).

Yet another flash-based technique that may be used to improve image picture quality in certain situations is to vary the power of the camera flash. Somewhat similar to the flash beam focusing technique described above, a variable flash power mechanism may be used to, for example, decrease the light output of the flash when exposure needs to be decreased (due to the flash being too bright). This technique is similar to the flash beam focuser in that it does not shift the angle of the peak of the spatial energy profile of the flash, relative to the center optical axis of the flash.

SUMMARY

An embodiment of the invention is an electronic camera device having an imaging sensor, a flash to illuminate the scene to be captured by the sensor, and an evaluator to detect a condition in the scene. The camera device also includes a redirector that shifts the peak of the spatial energy profile of light from the flash. The peak is to be shifted from being aimed at one region in the scene to being aimed at another region in the scene, in response to the evaluator having detected the condition in the scene. In other words, the angle of the peak of the spatial energy profile is changed, relative to a center optical axis of the flash, so as to increase illumination of, for example, a detected or selected object in the scene.

In one embodiment, detection of the condition or object in the scene may be performed automatically, through analysis of images captured by the sensor. In addition, or as an alternative, the evaluator can detect the particular condition in the scene based on the output of one or more scene condition sensor devices in the camera (e.g., ambient light sensor and auto focus sensor devices).

The combination of the flash and the redirector may be composed of a moveable flash lens system that is coupled to a flash light source element, to redirect light from the flash. The evaluator signals the moveable lens system to automatically move (e.g., pivot about an axis), so as to shift the peak of the spatial energy profile of the light. As an alternative, the combination of the flash and redirector may be implemented as a moveable flash light source element that is optically coupled to a fixed flash lens system, again to redirect light, i.e. change the angle of the peak of the spatial energy profile, in response to being signaled by the evaluator.

In another embodiment, the camera device may have a touch screen, which allows its user to manually select (via finger touch) a dark or dimly lit object or region in the scene, to be illuminated by the combination flash and redirector. The touch screen functions as a viewfinder, showing the scene before the camera. A selection may be made by the user's finger on the touch screen, which is translated to an object or region in an image of the scene. A mapping is performed between the selected object or region in the scene and the closest available angle to which the flash-redirector may be redirected, to illuminate the selected region when taking the picture. In a particular embodiment, the flash is implemented as an array of focused, but fixed light emitting diode (LED) lamps whose power is modulated or otherwise adjusted so as to illuminate the region of interest in the scene, relative to the rest of the scene (during picture taking).

One or more of the above described embodiments may help make more efficient use of the limited power and energy that is available in a portable electronic device, by limiting light output of the flash and at the same time directing or redirecting the peak of its spatial energy profile to just a subset of the scene (which may be lacking in sufficient natural light but is the primary region or object of interest in the scene). This capability is particularly desirable when, for example, taking video of a person being interviewed, because of the relatively long time interval during which the flash is turned on in such an application.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
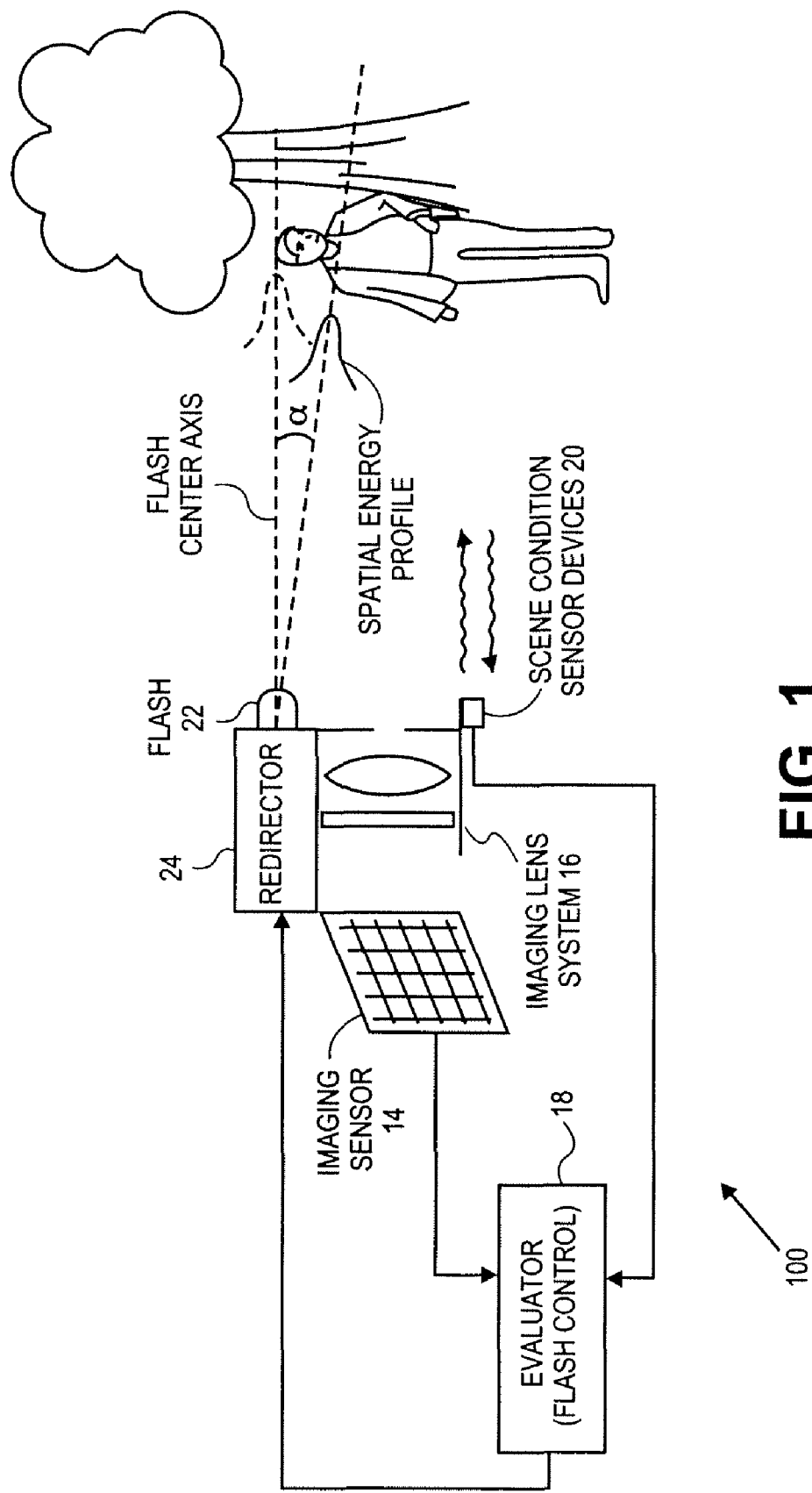
FIG. 1 shows a block diagram of an electronic camera device having a flash and redirector, in accordance with an embodiment of the invention.

FIG. 1 is a block diagram of a digital camera device 100 having a camera flash redirector, in accordance with an embodiment of the invention. The device 100 may be a portable device, such as a dedicated digital still or video camera, a smart phone or laptop/notebook computer with an integrated camera function, or it may be a desktop personal computer with a built-in camera function. In this example, the device 100 is shown as being aimed at a scene in which there is a person standing in front of a tree. The device has an imaging sensor 14 that captures images of the scene. The imaging sensor 14 may be a solid state or integrated circuit device that implements an array of sensor elements and associated analog and digital signal processing and exposure control circuitry. Examples include a complementary metal oxide semiconductor (CMOS) or a charge couple device (CCD) imaging sensor chip that is used in typical consumer grade digital still and video cameras, and in smart phones that have camera functionality. Although not explicitly called out, the device 100 includes data storage in the form of any suitable combination of for example dynamic random access memory and non-volatile solid-state memory (or other suitable data storage alternative). This is used to store the picture that is taken of the scene as well as any interim images that might be captured in the picture taking process.

Optically coupled to the imaging sensor 14 is an imaging lens system 16, which is aimed at the scene. The imaging lens system 16 may include one or more lenses to focus light from the scene onto a focal plane at which the imaging sensor 14 may be located, to form an optical image of the scene. Other elements may be included in the lens system 16, such as a variable or fixed aperture, and one or more light filters, all of which may be in accordance with conventional digital camera technology. Another option is a moveable imaging lens system that is referred to as a zoom lens or variable focus lens system, that may provide a range of focus and viewing angles, between, for example, telephoto and wide-angle.

The device 100 also includes one or more scene condition sensor devices 20. These may be solid state or integrated circuit devices that have circuitry or structure that is able to sense various conditions in a remote fashion, e.g. detect objects in the scene. For example, an ambient light sensor device (ALS) can provide a measure of the level of visible light intensity in the environment surrounding the device 100 (the so-called ambient light level). Another example is an auto focus sensor, such as one that has an infrared transmitter and receiver, which can be aimed at a particular object in the scene, to help determine a measure of the distance to or location of the object. Such information is typically used in digital cameras that have an auto focus mechanism. Such a mechanism may be able to automatically change the focus of the imaging lens system 16 so as to track or maintain an object in the scene within focus, as the object moves relative to the camera device. This is also referred to as a locking auto focus mechanism and is based on sensing movement of the object in the scene.

The device 100 also has a flash 22 that is associated with a redirector 24. One or more light source elements may be present in the flash 22, to produce a flash of light or, in the case of video capture, for a longer duration, in order to illuminate the scene while pictures are being taken at the same time. This additional light may be controlled in response to the shutter button being pressed by the user. The flash 22 allows a picture to be taken without increasing the exposure time, thereby capturing a sharper picture even while there may be some relative movement between the device 100 and the object being illuminated. The light source for the flash 22 may be an electrically powered gas discharge tube, such as a xenon tube, or it may be more recently developed technology such as a flash LED lamp. The flash 22 has an optical flash center axis, which may run through the center or peak of the spatial energy profile of the light produced by the flash (see FIG. 1). In a normal setting, the optical flash center axis may be aimed at the center of the picture frame of the device 100.

Associated with the flash 22 is a redirector 24. The redirector 24 may redirect or shift the peak of the spatial energy profile of light from the flash 22, to a different angle or spot. In particular, the peak can be shifted from being aimed at one region or spot in the scene that may be aligned with the flash center axis, to being aimed at another region or spot in the scene. This is depicted in FIG. 1 by the angular movement of the spatial energy profile, in accordance with the angle $\alpha$. This shift is produced in response to a control signal from an evaluator 18.

The evaluator 18 (also referred to as a flash control unit) is responsible for setting the angle $\alpha$ of the flash 22 to illuminate a desired spot or region, by appropriately signaling the redirector 24 based on having detected certain conditions or objects in the scene. For example, the evaluator 18 might detect the face of a person in the scene, as suggested in FIG. 1, through automatic analysis of one or more interim images of the scene that have been captured by the sensor 14. In addition, or as an alternative, the evaluator 18 may detect a particular condition in the scene as one where there is a bright background in one region or spot of the scene, but a dark object or spot in another region (e.g., due to the shadow of a tree). This detection may be based not just on analysis of interim images captured by the imaging sensor 14, but also based on information about the scene obtained by one or more of the scene condition sensor devices 20. The camera device may thus act automatically based on image analysis and sensor data (e.g., ambient light level or measured distance to a particular object), to redirect the flash 22 at the appropriate angle $\alpha$. The detection may occur during an otherwise typical picture taking process, e.g. between the time that a user has initially pressed the shutter button part of the way, until the time when he has pressed the button all the way. Such flash control helps make more efficient use of the light available from the flash 22, to illuminate just the object or spot of interest. In practice, given the spatial spread of typical energy profiles, areas close to the spot at which the peak is aimed may also be illuminated although to a much lesser extent than the peak.

Figure 2:
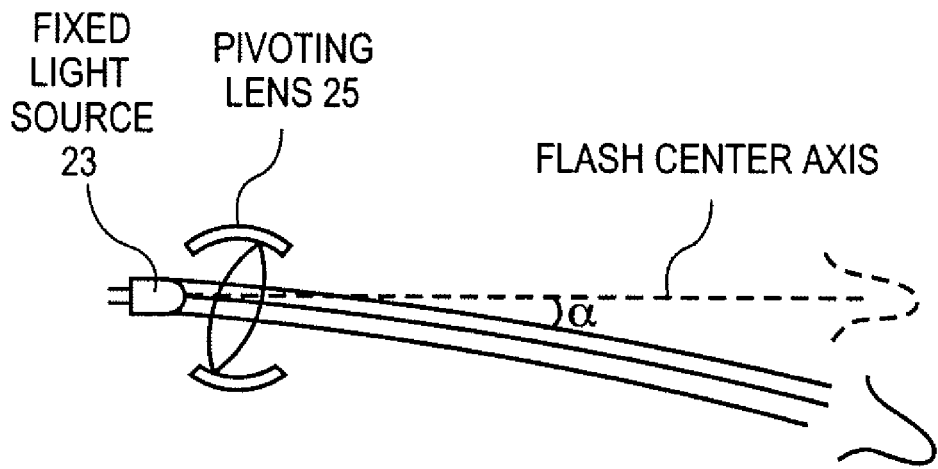
FIG. 2 shows an example combination flash-redirector.
Figure 3:
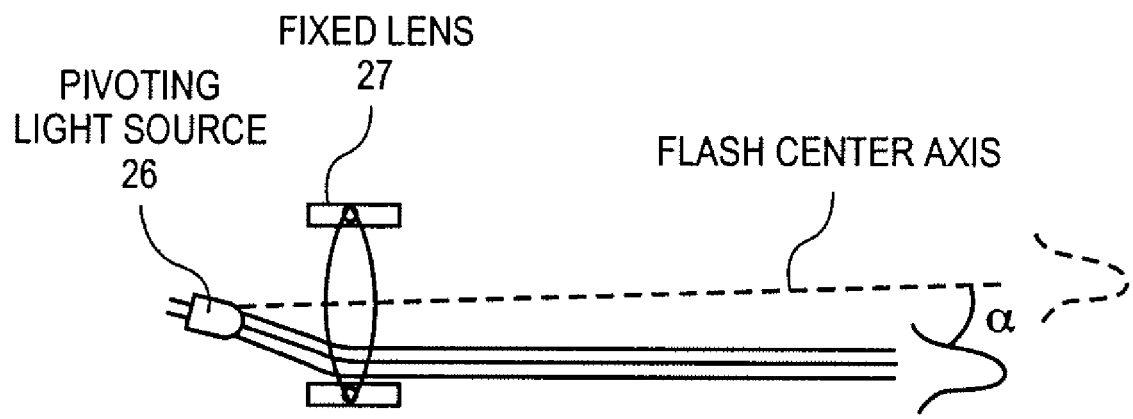
FIG. 3 shows another example flash-redirector.

The action of the redirector 24 upon the flash 22, namely to change the flash angle $\alpha$, can be supplemented with a flash lens that may be located in front of the flash light source element. The lens helps focus the spatial energy profile, that is, reduce the spatial spread of the light, thereby further concentrating the energy available from the light source into a smaller area around the peak. FIG. 2 and FIG. 3 depict different versions of a flash-redirector combination having such a flash lens.

In FIG. 2, an example combination of the flash-redirector is shown in which a fixed light source 23 is optically coupled to a pivoting flash lens 25. The pivoting flash lens 25 has a lens mechanism in which a lens can pivot, under control of an actuator mechanism, by approximately the angle α relative to the flash center axis (to achieve the desired redirection angle α). The actuator mechanism may be a motorized device that can respond to an automatic control signal, or it may be a user-powered mechanical coupling. The pivoting flash lens 25 may thus achieve the flash redirection angle α, for a relatively collimated beam of light from the fixed light source 23. Note also that there may be a further lens or focusing mechanism inside the fixed light source 23 that may further help in collimating or focusing the light beam.

The lens mechanism may be restricted so that its lens pivots only in a single plane, e.g. a horizontal plane that is aligned with the flash center axis. Alternatively, a more complicated lens mechanism may be provided that supports the redirection angle α in multiple planes or, at the extreme, in all planes.

In another embodiment, rather than pivoting a single flash lens to achieve multiple (different) redirection angles, a number of lenses are provided where each lens is aimed at a different angle. An actuator mechanism can place each of the lenses in front of the light source one at a time, thereby obtaining a range of redirection angles. For example, the lenses may each be aimed at the scene but fixed at a different angle, and fitted along the rim of a wheel. The light source is located behind and aligned with the rim of the wheel. The user can rotate the wheel until the lens that produces the desired redirection angle α appears directly in front of the light source.

Turning now to FIG. 3, another example combination flash-redirector is shown. Here, there is a pivoting light source 26 having an actuator mechanism that changes the angle of its light source element or lamp relative to the flash center axis, again to result in a shift in the peak of the spatial energy profile of the flash 22. The pivoting light source 26, in this example, directs its beam of light to a fixed lens 27. A change in the flash angle α of a relatively collimated beam of light is achieved, by pivoting the lamp relative to the fixed lens 27. Also in this example, the pivoting light source 26 may include its own lens separate from the fixed lens 27, to help further a collimate the beam of light as shown.

In yet another embodiment, the diffusion of light from the flash-redirector combination can be controlled, by surrounding its lamp with a liquid crystal cell. Changes to the collimation or spread of the spatial energy profile of the light beam may be achieved by energizing the liquid crystal cell at different levels. Thus, the redirector 24 in this embodiment would include the liquid crystal cell, the latter responding to a control signal from the evaluator 18 so that the combination flash-redirector as a whole illuminates just the area of interest in the scene that is being recorded by the device 100. The use of the liquid crystal cell may be coupled with one of the pivoting mechanisms of FIG. 2 and FIG. 3 to effect the change in the flash angle α.

Figure 4:
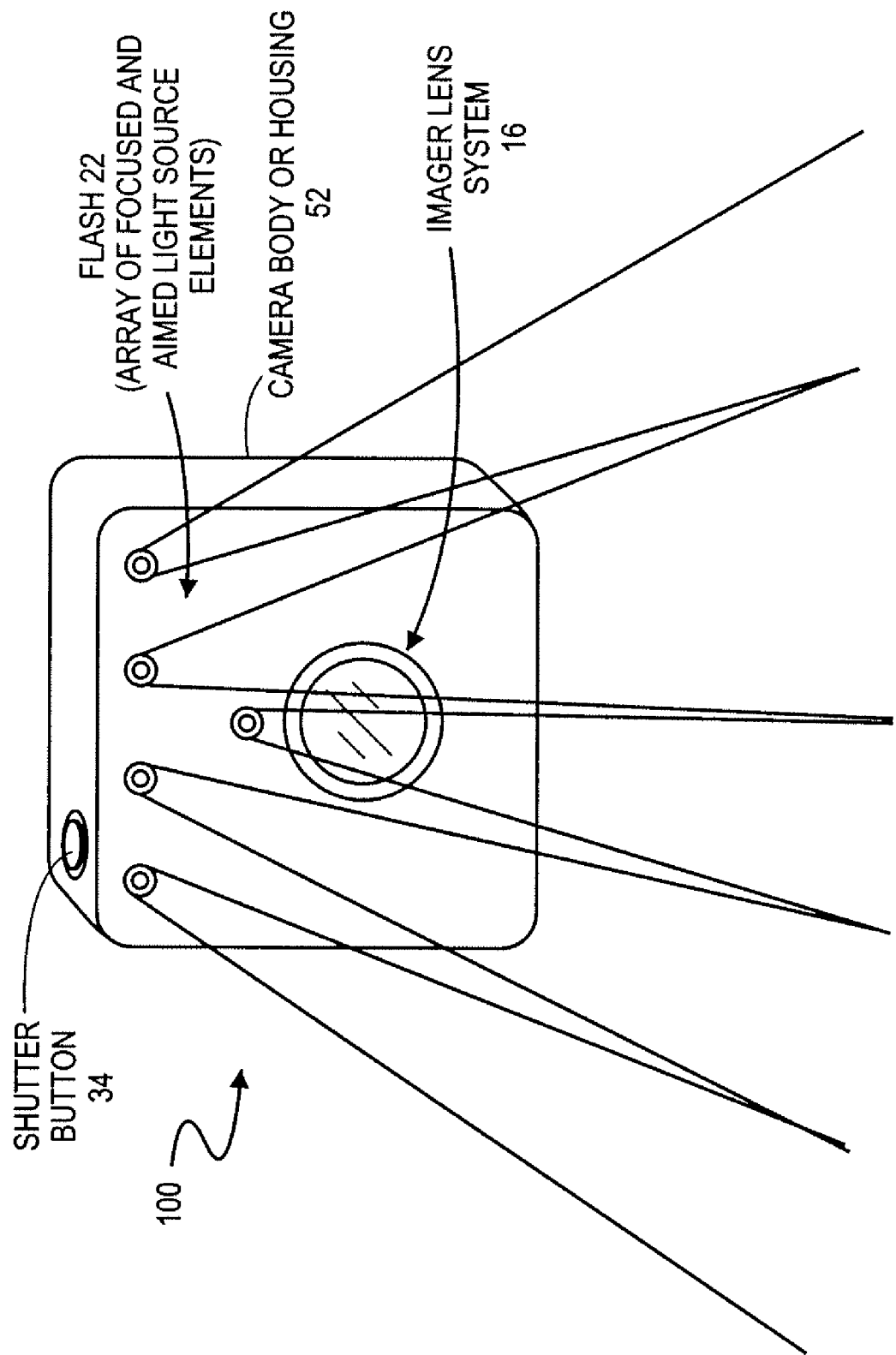
FIG. 4 shows an example portable electronic camera device that has an array of focused and aimed light elements for its flash-redirector.

Turning now to FIG. 4, another embodiment of the invention is shown, as an example digital camera device 100 having a camera body or housing 52 that has integrated therein the flash 22 and a physical shutter button 34 (e.g., a dedicated shutter button, such as one found in a dedicated still and/or video camera). In this case, the flash 22 is made of an array of focused and aimed light source elements or lamps. These may be light emitting diode, LED, flash lamps, each having its own flash lens and/or other optical structure such as a reflector that produces a collimated or narrow beam of light as shown. The light source elements are aimed such that the beam from each element will cover a different portion of the scene (at which the imager lens system 16 of the device 100 will be aimed). In this embodiment, the redirector 24 (see FIG. 1) may apply variable power to the array of lamps so as to illuminate the scene at variable levels (based on control signals from the evaluator 18). For example, each lamp may be controlled as being either on or off. Alternatively, additional circuitry may be added so that one or more of the lamps may have multiple, discrete power levels (between their fully on and fully off settings).

Similar to the capability described above in connection with FIG. 1, the evaluator 18 in the embodiment of FIG. 4 makes the decision as to what is the desired portion of the scene that is to be illuminated. This could be automatic, e.g. based on a detected condition in the scene through image analysis and/or scene condition sensor data. Alternatively, the desired portion could be manually selected or defined by the user, as described below in connection with FIG. 6. In either case, the redirector 24 may translate the decision regarding the portion of the scene to be illuminated, into the appropriate control signals that will be applied to the array of lamps so as to illuminate only the desired portion of the scene. In this case, the redirection is achieved by turning fully off (or at least dimming) some of the lamps and turning fully on (or at least making brighter) some others, so that the spatial energy profile of the array of lamps as a whole is shifted (in accordance with a redirection angle α relative to a center optical axis of the flash 22—see FIG. 1).

Figure 5:
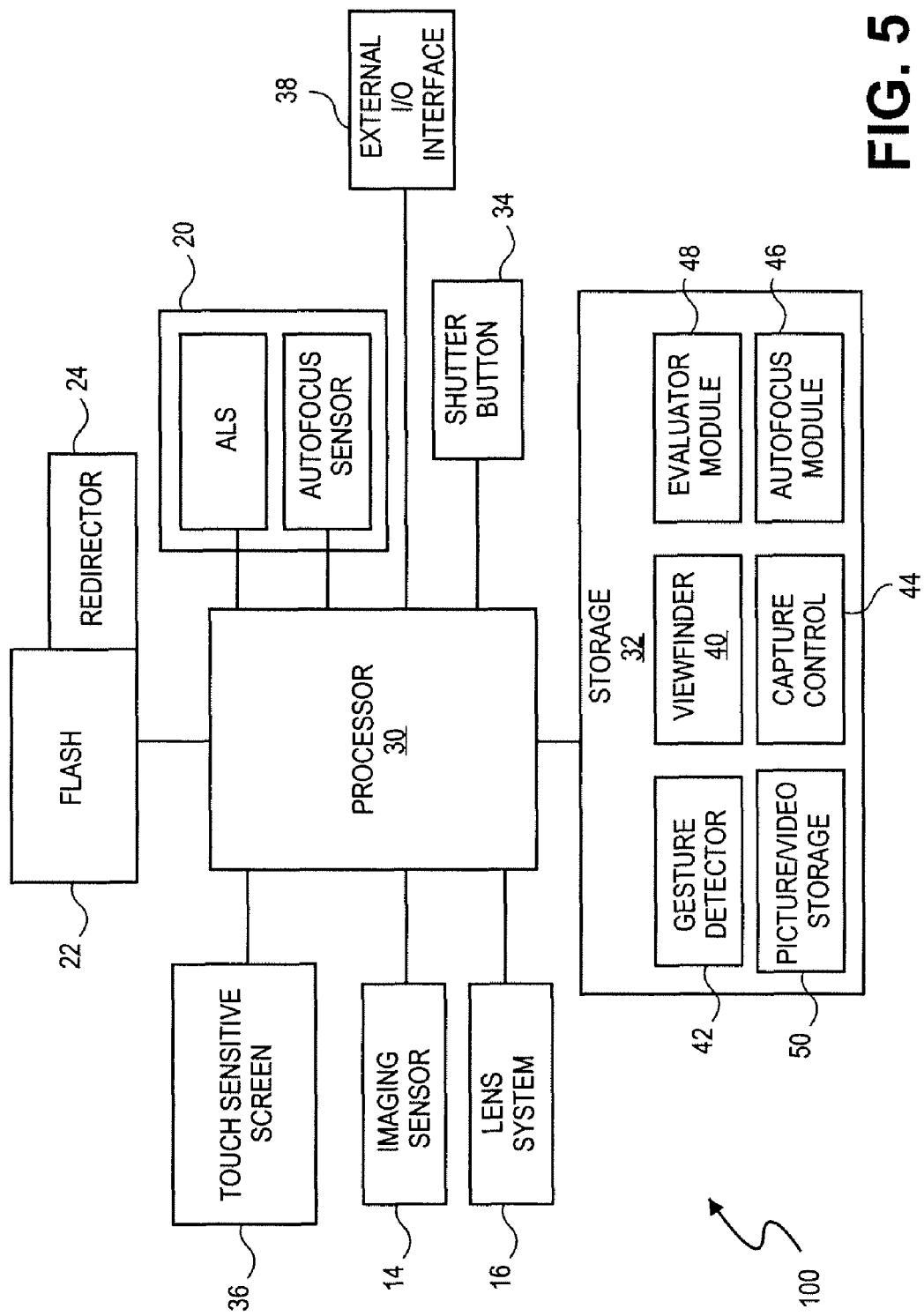
FIG. 5 is a more detailed block diagram of the functional units integrated within a digital camera device that is in accordance with an embodiment of the invention.

FIG. 5 is a block diagram of some of the hardware and program functional units that may be integrated within the digital camera device 100, in accordance with an embodiment of the invention. Beginning with the management or high level functions, these may be performed by a processor 30 executing program code or instructions (also referred to as program modules) that are stored or encoded in a storage 32. The processor 30 may include any suitable combination of programmable logical processing circuitry that is available in the device 100 to execute the program modules described below. Such circuitry may be selected from the following example group of integrated circuit devices: an applications processor such as one that is integrated in a typical multi function smart phone, a central processing unit (CPU) such as found in a dedicated portable digital camera or laptop personal computer, and a dedicated camera digital signal processor (DSP) chip. The storage 32 may include one or more of various types of data storage media, depending upon the particular type of device 100, e.g. fixed volatile and non-volatile memory such as random access memory, removable non-volatile storage such as a flash memory card, and mass storage such as an optical or magnetic disk drive. The storage 32 contains several program modules that implement the various camera functions described above, as well as some others to be discussed further below.

The camera functionality of the device 100 may be obtained by the following combination of components working with each other, all of which have been described above in connection with FIGS. 1-4: imaging sensor 14, imaging lens system 16, flash 22, redirector 24, scene condition sensors 20, and shutter button 34. Other typical camera functions may be implemented by specially programming the processor 30 in accordance with various program modules. These may include a capture control module 44, for managing various aspects of digital photography, including monitoring the shutter button 34, adjusting exposure settings and typical flash control for dimly lit scenes, digital image processing enhancements such white balance and color correction, transfer of the pictures or video to a separate, internal storage 50, and transfer of the pictures or video to an external device such as a desktop computer, a printer, or a remote network node. The external transfer may be performed by an external I/O interface 38 which may be for a high speed serial bus such as one that complies with an Institute of Electrical and Electronics Engineers, IEEE, Standard 1349 or a Universal Serial Bus, USB, specification, a flash memory card, a wired local area network, LAN, such as Ethernet, a wireless LAN, or a short range wireless link such as a Bluetooth link. There may also be an autofocus module 46 that performs a typical autofocus operation during the picture taking process, based on distance, proximity, and/or object tracking data that may be provided by an autofocus sensor (as part of the scene condition sensor devices 20).

As to the evaluator 18 (see FIG. 1), it may also be implemented as the processor 30 programmed in accordance with an evaluator module 48 to perform the functions described above. These include analysis of image data and scene condition sensor data to detect certain predefined scene conditions, such as a dark region or object that is in a bright background.

Figure 6:
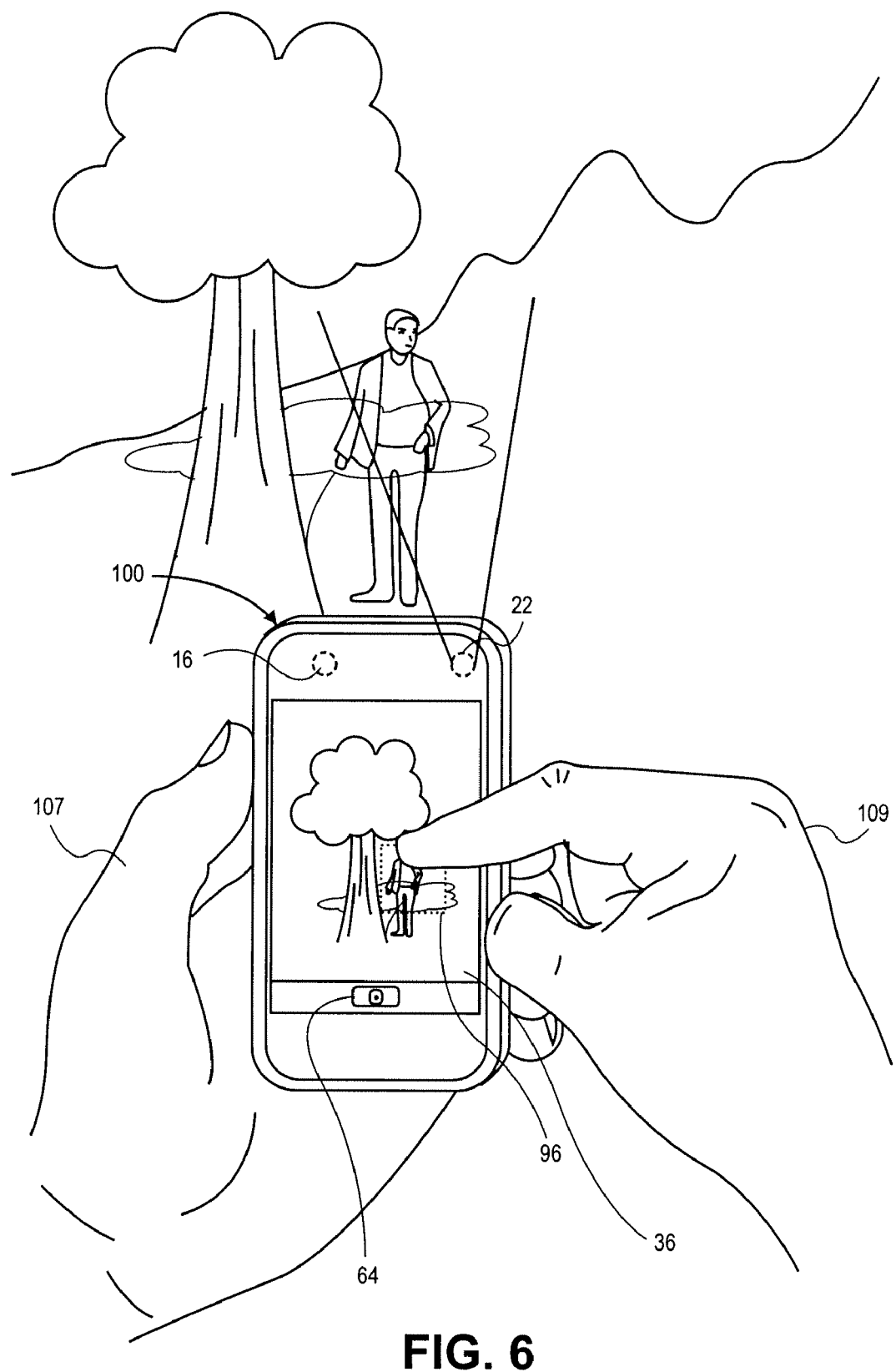
FIG. 6 shows the user of a touch screen in a portable electronic camera device that features a flash-redirector, in accordance with an embodiment of the invention.

Still referring to FIG. 5, this embodiment of the digital camera device 100 contains an integrated touch sensitive screen 36 working with the processor 30 programmed in accordance with a gesture detector module 42. That combination may be similar to one that is currently used in an iphone™ smart phone or multi function portable device from Apple Inc., which allows the user to input her commands or selections by finger touching an icon or a virtual button that is being displayed on the touch screen 36. Some typical camera functions that can also be implemented in the touch screen 36 include the electronic viewfinder (implemented as the processor 30 programmed in accordance with a viewfinder module 40) and a virtual version of the shutter button 34. FIG. 6 shows an example where the user is holding the device 100 in her left hand 107 and is performing a camera-related finger touch gesture with her right hand 109, on the touch screen 36. A touch screen viewfinder works with a virtual shutter button icon 64, both being on the front face of the device 100.

FIG. 6 also shows how the flash-redirector combination can be used in a touch screen embodiment of the invention. Here, the user is making a manual or touch selection on the touch screen viewfinder, which is previewing a scene at which the imaging lens system 16 is aimed. The selection will define the flash redirection angle α, so that the peak of the spatial energy profile of light from the flash will be redirected towards the object selected in the scene, namely a person that is standing under a tree. The person might be only dimly lit, relative to the background, due to the shadow of the tree for example. This camera touch screen capability may be implemented by configuring the capture control module 44 or the evaluator module 48 with a flash redirection routine that accepts a selection from the gesture detector 42 (see FIG. 5). The selection may be in the form of a target graphic 96 such as a contour that may be drawn by the user on the touch screen 36 (and detected by the gesture detector 42). Alternatively, the selection or target graphic 96 may be a fixed frame or a fixed solid area that moves with the user's finger across the screen 36. The capture control or evaluator module may then translate such a selection to for example the closest dimly lit object or region that is captured in an image of the scene produced by the viewfinder. A mapping is performed between the selected object or region and the closest available angle to which the flash 22 or the flash-redirector combination may be redirected, so that only the selected region is illuminated when taking the picture.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the embodiment of an array of variable power, focused LED flash lamps was described as being integrated in a dedicated still and/or video camera, that embodiment could alternatively be implemented in a multi function device such as a smart phone having a camera function. The description is thus to be regarded as illustrative instead of limiting.

What is claimed is:

1. A portable electronic camera device comprising:
    an imaging sensor to capture an image of a scene;
    a flash to illuminate the scene for capture by the sensor;
    an evaluator to detect a condition in the scene, wherein the condition is one where there is a bright background in one region in the scene and a dark object in another region; and
    a redirector comprising a moveable lens system coupled to the flash to focus light from the flash, the moveable lens system having a pivoting lens to shift the peak of a spatial energy profile of the focused light from the flash, wherein the peak is to be shifted from being aimed at said one region in the scene to being aimed at said another region in the scene, in response to the evaluator having detected the condition in the scene.

2. The portable device of claim 1 wherein the evaluator is to detect said condition through analysis of an image of the scene captured by the sensor.

3. The portable device of claim 1 wherein the flash remains in a fixed position when the pivoting lens pivots to shift the peak of the spatial energy profile of the focused light.

4. The portable device of claim 1 wherein the flash comprises a moveable light source,
    and wherein the evaluator is to signal the moveable light source to move so as to change the angle of the peak of the spatial energy profile of the focused light.

5. The portable device of claim 1 further comprising a touch screen, wherein the flash comprises an array of lamps, and wherein the redirector is able to apply variable power to the array of lamps to illuminate the scene at variable levels, depending upon one of (1) the detected condition in the scene, and (2) a selection made by a user of the device using a virtual button in the touch screen.

6. The portable device of claim 1 wherein the redirector comprises an automated lens mechanism containing a plurality of lenses that are to move in front of the flash to provide variable illumination of the scene.

7. The portable device of claim 6 further comprising a touch screen that is to function as a viewfinder to show the scene, wherein the evaluator is to signal the automated lens mechanism to illuminate a region of interest in the scene, relative to the rest of the scene, that has been selected by a user of the device in the viewfinder.

8. The portable device of claim 1 further comprising:
    a touch screen viewfinder that lets the user select the object or region in the scene at which the peak of the spatial energy profile of light from the flash is redirected.

9. A portable electronic camera device comprising:
    a touch screen that is to function as a viewfinder to show a scene;
    an imaging sensor to capture an image of the scene;
    a flash having an array of lamps to illuminate the scene for capture by the sensor;
    an evaluator to detect a condition in the scene wherein the condition is one where there is a bright background in one region in the scene and a dark object in another region; and a redirector to shift the peak of a spatial energy profile of light from the flash, wherein the peak is to be shifted from being aimed at said one region in the scene to being aimed at said another region in the scene, in response to the evaluator having detected the condition in the scene and wherein the redirector is to modulate power to the array of lamps to illuminate a region of interest in the scene, relative to the rest of the scene, that has been selected by a user of the device in the viewfinder.

10. A method performed by an electronic camera device that is aimed at a scene to be captured, the method comprising:

receiving via a touch screen viewfinder a flash selection made by a user of the device;

configuring a flash of the device in accordance with the received flash selection by changing an angle of the peak of a spatial energy profile of light flash relative to a center optical axis of the flash using a pivoting lens systems;

illuminating the scene using the configured flash; and capturing an image of the illuminated scene.

11. A method performed by an electronic camera device that is aimed at a scene to be captured, the method comprising:

receiving via a touch screen viewfinder a flash selection made by a user of the device;

configuring a flash of the device in accordance with the received, flash selection by changing an angle of the peak of a spatial energy profile of light from the flash relative to a center optical axis of the flash, said configuring comprises applying non-uniform power levels to an array of lamps that make up the flash so as to change said angle so that the peak is aimed at a dark object in one region in the scene and not a bright background in another region;

illuminating the scene using the configured flash; and capturing an image of the illuminated scene.

12. A method performed by an electronic camera device that is aimed at a scene to be captured, the method comprising:

detecting a condition in the scene using a sensor in the camera device by detecting a bright background in one region of the scene and a dark object in another region;

configuring a flash of the camera device in accordance with the detected condition by changing an angle of the peak of a spatial energy profile of light from the flash relative to a center optical axis of the flash, said configuring comprises changing the angle of the peak using a pivoting lens system so that the peak is aimed at the dark object and not the bright background;

illuminating the scene using the configured flash; and capturing an image of the illuminated scene.

13. The method of claim 12 wherein said detecting comprises:

analyzing an image of the scene captured by an image sensor of the camera device.

14. A method performed by an electronic camera device that is aimed at a scene to be captured, the method comprising:

detecting a condition in the scene using a sensor in the camera device by detecting a bright background in one region of the scene and a dark object in another region;

configuring a flash of the camera device in accordance with the detected condition by changing an angle of the peak of a spatial energy profile of light from the flash relative to a center optical axis of the flash, said configuring comprises applying non-uniform power levels to an array of lamps that make up the flash so as to change said angle so that the peak is aimed at the dark object and not the bright background;

illuminating the scene using the configured flash; and capturing an image of the illuminated scene.

15. A method performed by an electronic camera device that is aimed at a scene to be captured, the method comprising:

detecting a condition in the scene using a sensor in the camera device by detecting a bright background in one region of the scene and a dark object in another region;

configuring a flash of the camera device in accordance with the detected condition by changing an angle of the peak of a spatial energy profile of light from the flash relative to a center optical axis of the flash, said configuring comprises signaling a moveable light source to move so as to change said angle so that the peak is aimed at the dark object and not the bright background;

illuminating the scene using the configured flash; and capturing an image of the illuminated scene.

* * * * *